May 19, 1942.  A. D. WARREN  2,283,478
ROBOT FOR MOTOR VEHICLES
Original Filed July 5, 1939  5 Sheets-Sheet 5
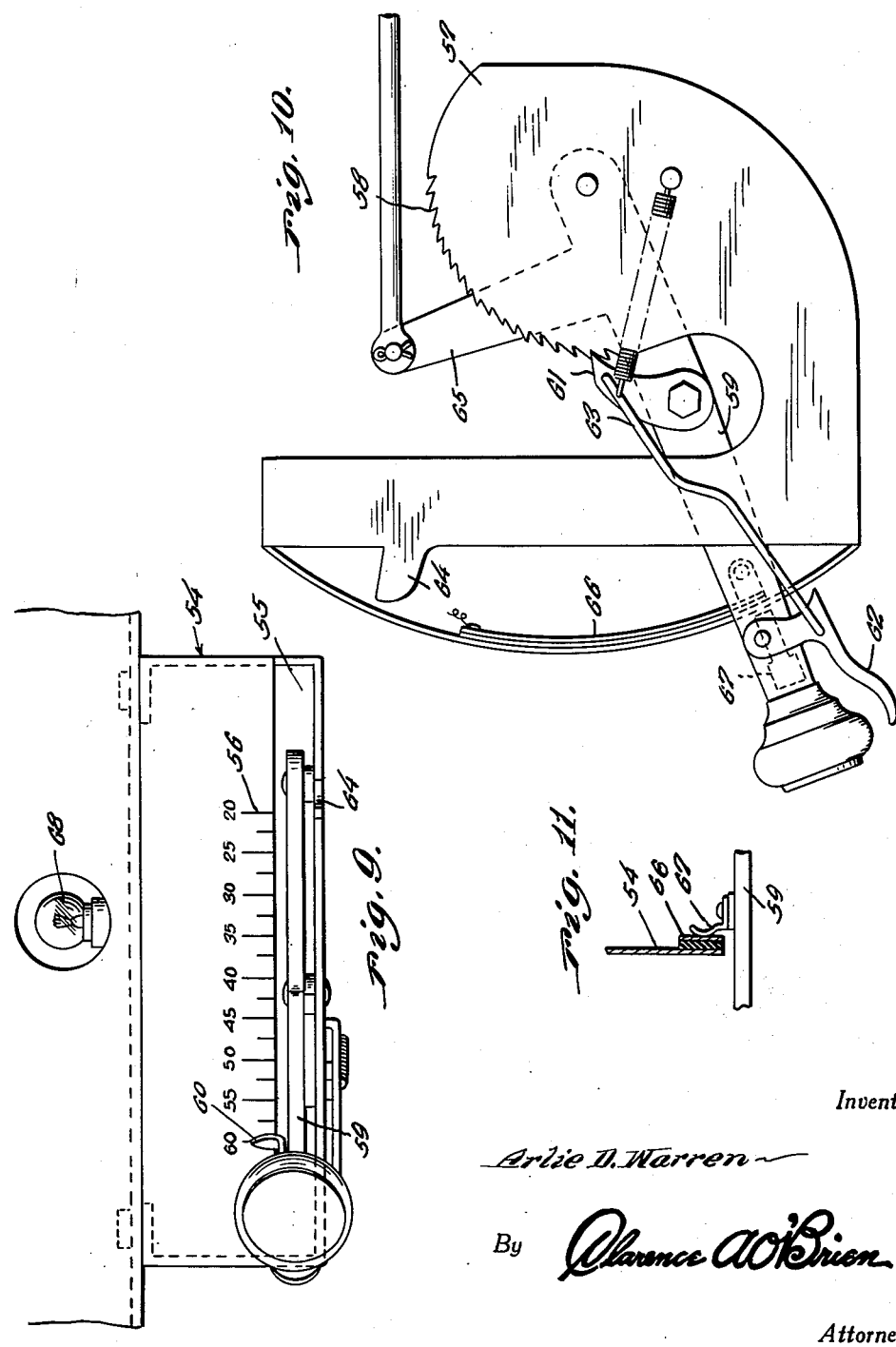
Inventor
Arlie D. Warren
By Clarence A. O'Brien
Attorney Patented May 19, 1942

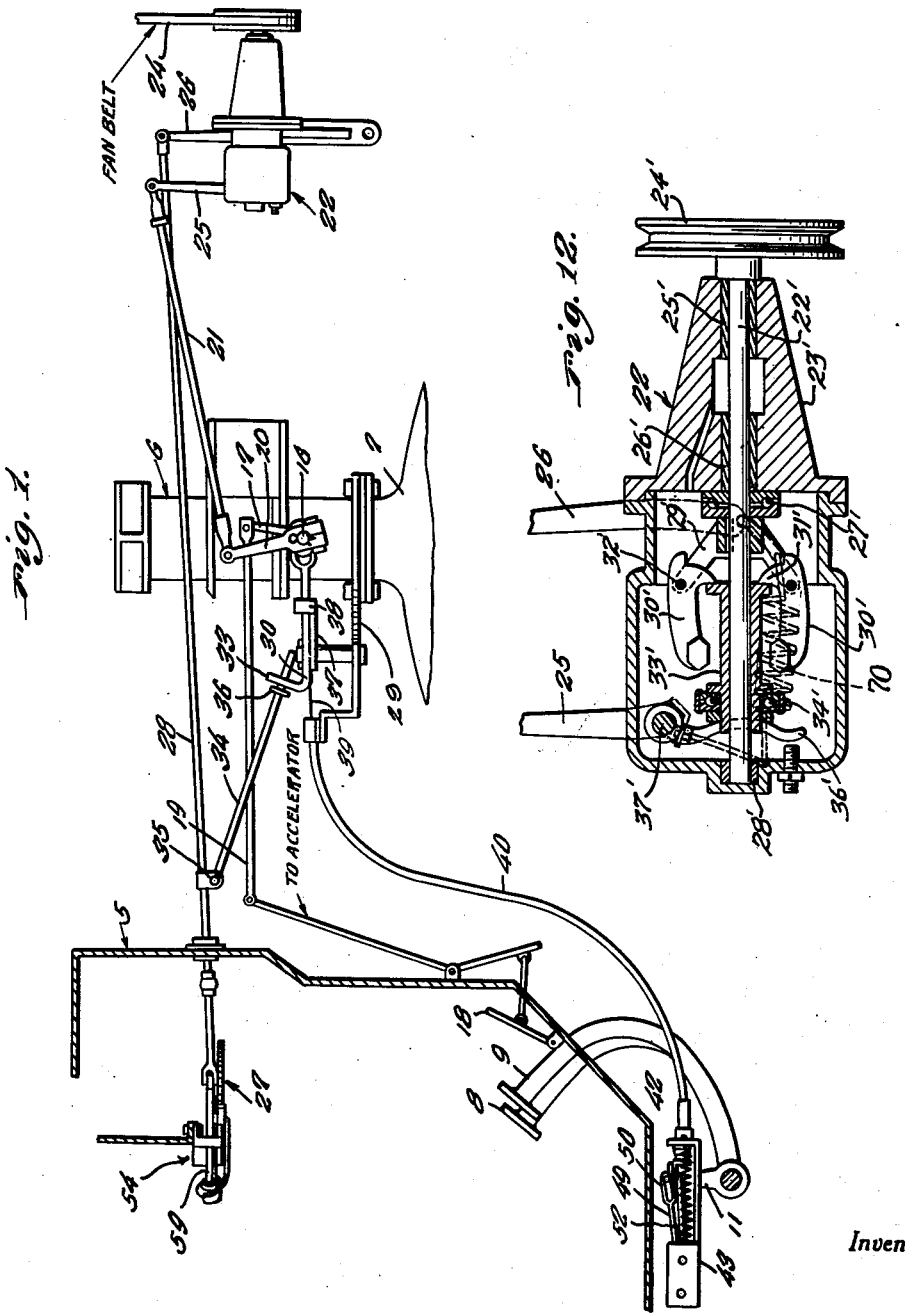

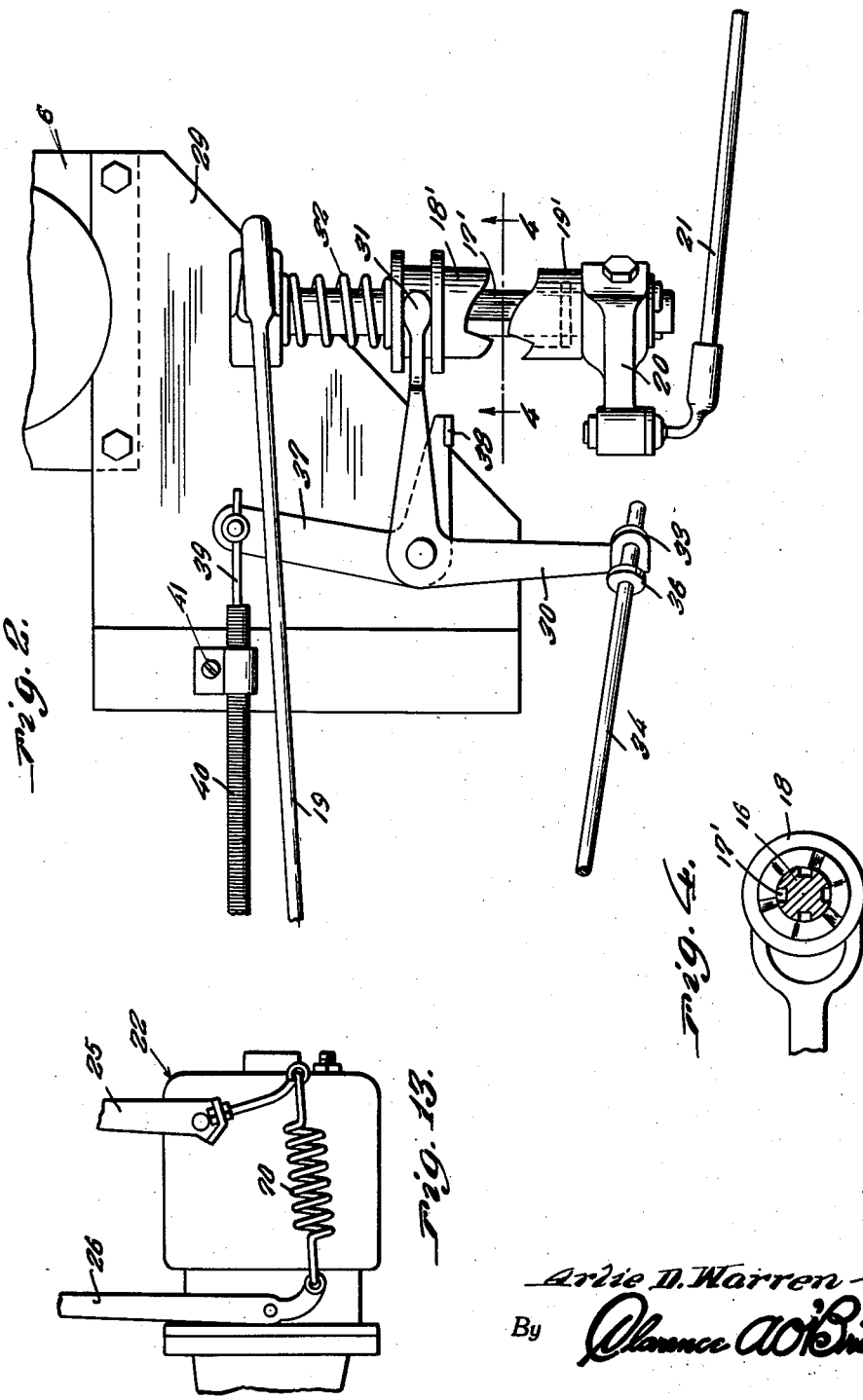

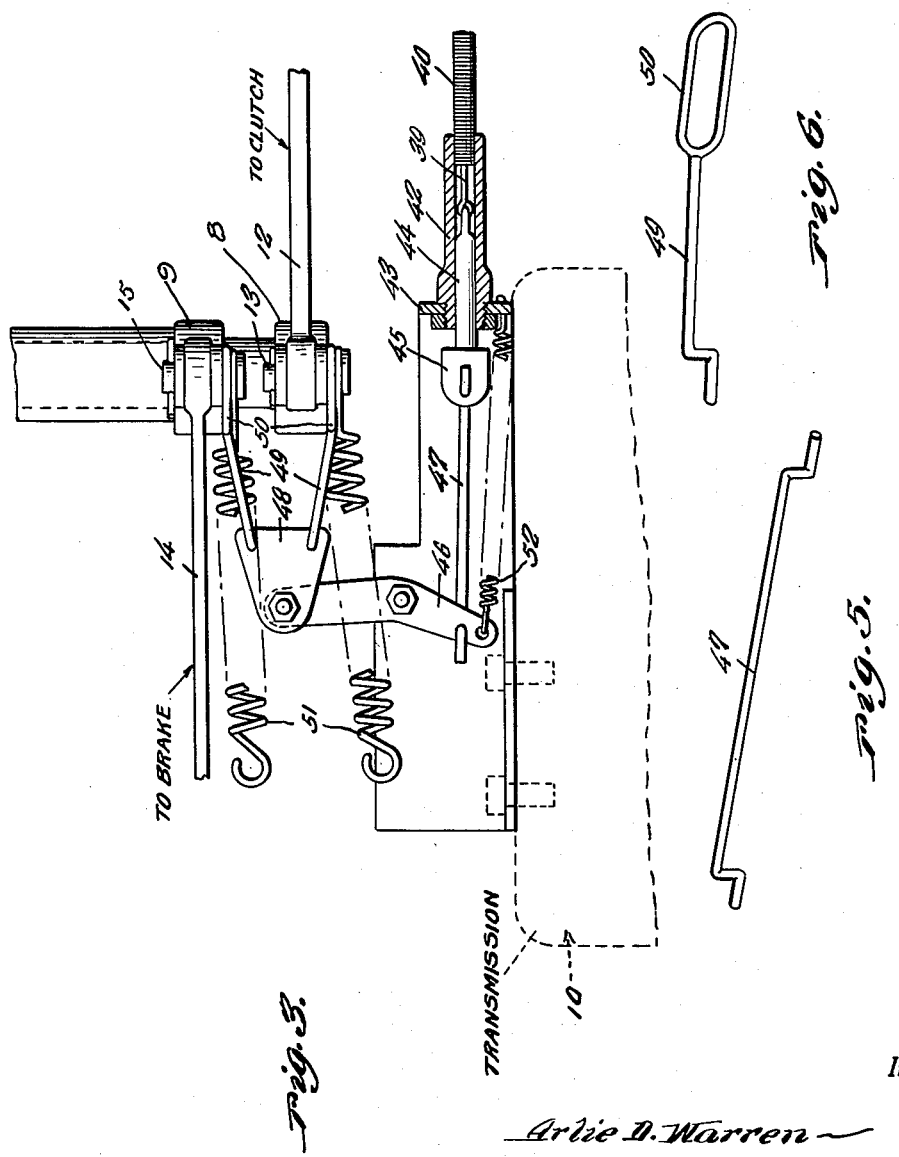

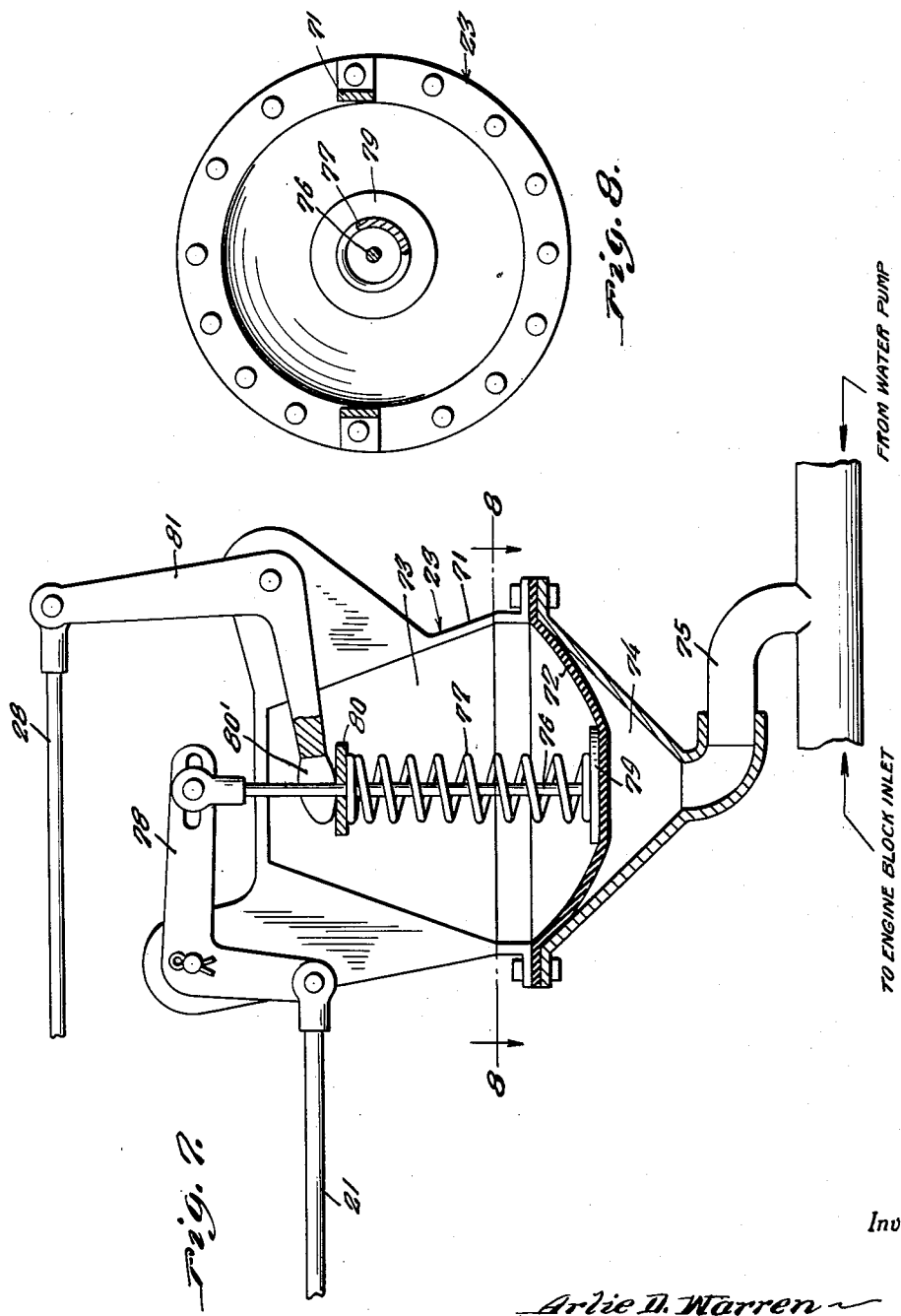

2,283,478

UNITED STATES PATENT OFFICE 2,283,478

ROBOT FOR MOTOR VEHICLES

Arlie D. Warren, Muskogee, Okla.

Original application July 5, 1939, Serial No. 282,953. Divided and this application May 8, 1940, Serial No. 334,075

4 Claims. (Cl. 192—.01)

This invention relates to a robot for motor vehicles and more particularly to divisional subject matter of my copending application filed July 5, 1939 and Serial No. 282,953, which has issued as Patent No. 2,238,838, dated April 15, 1941.

The primary object of this invention resides in means whereby the governor of the robot which maintains the engine of the motor vehicle operating at a selected speed may be rendered inoperative as to its control of the engine when the motor vehicle is slowed down through the actuation of the brake or clutch pedals and to assume its control of the engine as soon as the operator permits the brake pedal to return to non-brake applying position and the clutch pedal to assume clutch engaging position, said means thus permitting conventional engine operation at the time the motor vehicle is slowed down or brought to a stop.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view, showing the application of my invention to a portion of a motor vehicle.

Figure 2 is a fragmentary top plan view illustrating the clutch mechanism for connecting and disconnecting the governor mechanism with the throttle of the carburetor of the motor vehicle.

Figure 3 is a fragmentary top plan view, partly in section, showing the connection of the present invention with the clutch and brake mechanism of the motor vehicle.

Figure 4 is a detail sectional view taken on the line 4—4 of Figure 2.

Figure 5 is a perspective view illustrating a connecting rod.

Figure 6 is a perspective view illustrating a connecting link.

Figure 7 is a fragmentary vertical sectional view illustrating one type of governor mechanism which may be employed in conjunction with the present invention.

Figure 8 is a sectional view taken on the line 8—8 of Figure 7.

Figure 9 is a fragmentary front elevation illustrating a control mechanism.

Figure 10 is a fragmentary side elevation illustrating the control mechanism.

Figure 11 is a detail sectional view showing a circuit closer.

Figure 12 is a vertical sectional view illustrating one of the types of governors used in connection with this invention.

Figure 13 is a fragmentary side elevation illustrating one side of the governor shown in Figure 12.

Referring in detail to the drawings, the numeral 5 indicates a fragmentary portion of a motor vehicle body, 6 a carburetor connected to an intake manifold 7 of an engine (not shown) of the motor vehicle. The clutch and brake pedals of the motor vehicle are indicated by the characters 8 and 9, while a portion of the transmission housing of the motor vehicle is indicated by the character 10. The clutch pedals 8 and 9 have connected to the journal ends thereof arms 11. The arm 11 of the clutch pedal is shown connected to a clutch operating rod 12 by a pin 13 extending through said arm 11 while the arm 11 of the brake pedal is connected to a brake operating rod 14 by a pin 15. The carbureter 6 or throttle valve thereof (not shown) is equipped with the usual shaft 16 to which an arm 17 is secured. The arm 17 is connected to the accelerator mechanism 18 of the vehicle by a connecting rod 19. It is to be understood that all of the heretofore described construction is conventional on an automobile or motor vehicle except the shaft 16 which is modified to permit the application of this invention to the carbureter. The shaft 16 has a splined portion 17' on which is splined a clutch element 18' adapted to coact with a clutch element 19' journaled on the shaft 16 and which has adjustably secured thereto an arm 20. A connecting rod 21 joins the arm 20 to a governor mechanism 22.

It is to be understood that the governor mechanism 22 may be of the type as shown in Figures 1 and 12 or of the type as shown in Figures 7 and 8 and indicated by the character 23.

The governor mechanism 22 is of the conventional construction and is manufactured and sold under the name of "Pierce" and is frequently employed for controlling speeds of operation of internal combustion engines principally used for stationary work. Further, it is to be understood that the governor mechanism 22 is driven from the engine (not shown) of the motor vehicle by a belt 24. The governor mechanism 22 includes a throttle operating arm 25 and a control arm 26. The purpose of the control arm 26 is to vary the action of the governor on the throttle valve of the carbureter. The governor control arm 26 is connected to a speed varying control 27 mounted in convenient reach of the operator or driver of the motor vehicle. The connection between the speed varying control 7 and the arm 26 is by a rod 28.

A bracket 29 is mounted on the carbureter 6 and pivotally supports a bell crank lever 30, one end of which is forked, as shown at 31, and is received between spaced flanges of the clutch element 18'. The clutch element 18' is normally urged in the direction of the clutch element 19' by a coil spring 32. The other end of the bell crank lever 30 has an upstanding apertured ear 33 which slidably receives a connecting rod 34 and the latter is secured on the connecting rod 28 by a clamp 35 including a pivot which permits the rod 34 to pivot relative to the rod 28. The clamp also permits adjustment of the rod 34 endwise of the rod 28. A stop collar 36 is mounted on the connecting rod 34 to engage with the ear 33 after a predetermined movement of the rod 34 by the rod 28 for the purpose of pivoting the bell crank lever 30 to bring about disengagement of the clutch element 18' from the clutch element 19' and thereby free the connection between the governor mechanism and the throttle valve of the carbureter.

A bell crank lever 37 is pivotally mounted on the bracket 29, employing the same pivot as the bell crank lever 30 and one end thereof carries a right angularly disposed extension 38 which is adapted to engage with the bell crank 30 on the movement of the bell crank lever 37 in one direction for the purpose of imparting pivotal movement to the bell crank lever 30 by the bell crank lever 37 to bring about disengagement of the clutch element 18' from the clutch element 19'. A Bowden wire 39 is connected to the bell crank lever 37 and the housing 40 thereof is supported on the bracket 29 by a clamp 41 and also by a sleeve 42 and the latter is carried by a bracket 43 mounted on the transmission housing 10. A fitting 44 couples the Bowden wire 39 to a head 45 which is connected to a bell crank lever 46 pivotally mounted on the bracket 43 by a connecting link 47, the latter having offset ends, as clearly shown in Figure 5. The bell crank lever 46 has pivoted to one end thereof a tie plate 48 to which are pivotally connected links 49 having elongated loop portions 50 which receive the pins 13 and 15 of the clutch and brake pedals. Coiled springs 51 are connected to the pins 15 and 13 and to the vehicle for the purpose of restoring the clutch and brake pedals to their normal positions. A coiled spring 52 is connected to the bell crank lever 46 and to the bracket 43, tending to hold the bell crank lever 46 in such a position that the pins 15 and 13 will be positioned at one end of the looped portions 50 of the connecting rods or links 49. The specific connection as described and shown in the drawings between the bell crank lever 46 and the brake and clutch pedals is for the purpose of permitting the Bowden wire 39 to be actuated by either the clutch or brake pedals independently of each other or to be operated by the simultaneous movement of the brake and clutch pedals.

Thus it will be seen that the bell crank lever 37 will be operated by either the operation of the brake pedal or the clutch pedal or both. With this arrangement the driver of the vehicle when slowing down said vehicle, depresses the brake pedal which brings about disengagement of the clutch elements 18' and 19' disconnecting the governor mechanism from the throttle valve of the carbureter. In many instances, the driver depresses the clutch pedal at the same time as he depresses the brake pedal which also brings about disengagement of the clutch elements 18' and 19' or the depressing of the clutch pedal alone will bring about disengagement of the clutch elements 18' and 19'. Therefore, it will be seen that when the vehicle is slowed down or brought to a stop the governor mechanism is disconnected from the throttle valve of the carbureter, consequently permitting the engine to operate in a conventional manner or at idling speed.

The control mechanism 27 heretofore briefly referred to consists of a casing 54 mounted in convenient reach of the driver of the motor vehicle and is provided with a slot 55 and located on the casing adjacent said slot are graduations 56 denoting miles per hour and in this instance as shown has from twenty miles per hour to sixty miles per hour. A portion of the casing 54 forms a quadrant 57, the teeth of which are indicated by the character 58. A control lever 59 is pivotally mounted on the quadrant and extends through the slot 55 and carries a pointer 60 movable over the graduations 56. A spring influenced dog 61 is pivotally mounted on the lever 59 to coact with the teeth 58 of the quadrant 57 for releasably securing the lever in various adjusted positions with respect to the graduations. A latch having a hand grip 62 is pivotally mounted on the lever 59 adjacent the handle thereof and is connected to the dog 61 by a connecting rod 63, whereby the operator may release the dog from the teeth 58 for adjusting the lever 59 with respect to the graduations.

A stop 64 is formed on the casing 54 adjacent one end of the slot and is adapted to be engaged by the latch 62 for locking the lever 59 in neutral position, that is, in a position for rendering the present invention inoperative. An extension 65 is formed on the lever 59 adjacent the pivoted end thereof and has the connecting rod 28 pivoted thereto. It will be seen through the varying of the position of the lever 59 the governor mechanism 22 may be controlled, also the clutch elements 18' and 19' may be engaged and disengaged. This permits the driver to have direct control of the governor for the connection thereof with the throttle valve of the carbureter.

A contact strip 66 is mounted on the casing 54 adjacent the slot 55 and extends the distance of the graduations on the casing and is engaged by a contact 67 carried by the control lever 59 when said control lever is in position opposite any one of the markings of the graduations 56. The contacts 66 and 67 are connected in an electric circuit (not shown) which includes therein a signal lamp 68, so as to give an indication or warning when the control lever 59 is in any of its positions other than neutral position.

The governor mechanism 22 includes in its construction a spring 70, the tension of which is varied through the movement of the arm 26 in opposite directions. When the arm 26 is moved to the right in Figure 1, the tension of the spring 70 is decreased and when moved to the left is increased. This spring 70 also acts on the arm 25 of the governor and the latter is further acted on by the speed of the engine. The movement of the arm 25 to the right in Figure 1 closes the throttle and the movement of the arm 25 to the left in Figure 1 opens the throttle. The tendency of the spring 70 is to open the throttle through the movement of the arm 25. The tension of the spring 70 is varied by the position occupied by the control lever 59 and when the latter is in neutral position, that is, with the latch 62 in engagement with the stop 64 the tension on the spring 70 is at the lowest and as before stated, the clutch elements 18' and 19' are disengaged by the connection of the rod 34 to the rod 28 and the stop collar 36 engaging the ear 33 of the bell crank lever 30 and thereby impart a pivotal movement to the latter.

It has been stated that the governor 22 is acted upon by the speed of the engine. As explanatory, the type of governor 22 concerned includes a governor shaft 22' journaled in a casing 23', one end of said shaft extending out of said casing and having fast thereon a driven pulley 24' over which the belt 24 is trained. Suitable bearings 25', 26', 27' and 28' are provided in the casing 23' for said shaft 22'. A spider 29' is fixed on the shaft 22' within the casing 23'. A pair of weighted centrifugal throw arms 30' are pivoted as at 32' on said spider 29' upon opposite sides of said shaft 22', respectively, and provided with ears 31' adapted under outward throw of said arms to engage the flanged end of a sleeve 33' and move the latter endwise in one direction along said shaft 22', said sleeve being slidably mounted on said shaft for such movement thereon. The sleeve 33' is provided on its other end with an end thrust bearing 34' which, under movement of said sleeve 33' in said direction, exerts pressure against a crank arm 36' depending from and fast on a rock shaft 37' having the beforementioned arm 25 fast thereon. Such pressure against said crank arm 36' swings the same to rock the shaft 37' in a direction such that the arm 25 is moved, in opposition to the spring 70, to the right, as shown in Figures 1 and 12, to thereby close the throttle valve of the carburetor through operation of the rod 21 and arm 20.

When driving the motor vehicle at any speed below twenty miles per hour, the throttle valve is operated through the accelerator mechanism as usual. However, when the vehicle is to be driven for a long distance and under safe road conditions, the operator moves the control lever 59 opposite to the graduation marking designating the speed at which it is desired for the vehicle to operate. When the control lever 59 assumes this latter-named position, the signal lamp 68 is illuminated, a certain amount of tension is placed on the spring 70 of the governor mechanism and the clutch elements 18' and 19' are engaged which connects the governor mechanism to the throttle valve of the carbureter. With the governor mechanism connected to the throttle valve of the carbureter, the speed of the engine will then be controlled automatically and maintained at the selected speed regardless of load condition. Should it be necessary to slow the vehicle down, the operator depresses either the clutch or brake pedals or both which brings about disengagement of the clutch element 18' from the clutch element 19', interrupting the control of the governor of the throttle valve and permits the latter to be actuated as usual by the accelerator mechanism or the engine at idling speed. As soon as the slowing down of the vehicle is discontinued and the clutch and brake pedals return to normal position, permits the spring 32 to engage the clutch element 18' with the clutch element 19' restoring the driving connection between the governor mechanism and the throttle valve of the carbureter so that the control of speed of the engine is then again at the selected speed or at the speed setting made by the control lever 59. It is to be understood that after the slowing down of the vehicle and it is again desired to place the engine under the control of the governor it is necessary that the engine speed be increased through the use of the accelerator to correspond with the speed setting of the control mechanism 27.

The governor mechanism 23 may be substituted for the governor mechanism 22 on engines of motor vehicles that employ a positive circulation of the fluid in the cooling system. The governor mechanism 23 is in the form of a casing 71 in which is mounted a diaphragm 72. The diaphragm divides the casing 71 into separate chambers 73 and 74. The chamber 74 is connected directly to the cooling system of the engine of the motor vehicle by a pipe 75 so that the pressure of the fluid in said cooling system will be directly against the diaphragm at one side thereof while the opposite side of the diaphragm is engaged by a plunger-like member 76 under the influence of a spring 77. The member 76 has a pin and slot connection with a bell crank lever 78 pivotally mounted on the casing 71 and to which is pivoted the connecting rod 21. One end of the spring 77 seats against a head 79 which bears against the diaphragm while the other end of the spring 77 engages a collar 80 slidable on the member 76. The collar is engaged by a forked end 80' of a bell crank lever 81 pivotally mounted on the casing 71 and to which is pivotally connected the connecting rod 28. Thus it will be seen that the tension of the spring 77 may be varied by the position occupied by the control lever 59 of the control mechanism 27. The action of the spring 77 is to open the throttle valve while the fluid pressure in the chamber 74 of the casing of the cooling system acts to close the throttle valve.

It will be seen that due to the increased speed of the engine with increased pressure of the fluid in the cooling system, the throttle valve will be moved towards a closed position and as this pressure decreases the spring opens the throttle valve. This arrangement permits the speed of the vehicle to be maintained at the speed set by the control lever 59 of the control mechanism 27.

A device of the character described in detail and shown in the drawings can be conveniently adapted to motor vehicles now in the use whereby the speed of the vehicle may be automatically maintained at a selected rate of speed and that the selected rate of speed may be varied at the will of the operator and further it will be seen that the construction of this device is such that it will automatically render the device inoperative when it is necessary to slow down or stop the vehicle and to again come into operation when the vehicle reaches a predetermined speed, that is, when the brake pedal is released and the clutch pedal allowed to assume clutch-engaging position.

It is believed that the foregoing description, when taken in connection with the drawings will fully set forth the construction and advantages of this invention to those skilled in the art to which such a device relates, so that further detailed description will not be required.

Having thus described the invention, what I claim is:

1. In an automotive vehicle, the combination with an engine, a fuel control throttle for the engine, an engine operated governor for operating said throttle, and clutch and brake pedals, respectively, the former for establishing a driving relation between the engine and vehicle, of a clutch between said governor and throttle, and means operative by independent operation of said brake and clutch pedals and also by simultaneous operation of both for operating said clutch.

2. In an automotive vehicle, the combination with an engine, a fuel control throttle for the engine, an engine operated governor for operating said throttle adjustable for variable operation, and clutch and brake pedals, respectively, the former establishing a driving relation between the engine and vehicle, of a clutch between said governor and throttle, means settable into different positions to variably adjust said governor, means operative by said first means in different settings thereof to operate said clutch, and means operative by independent operation of said clutch and brake pedals and also by simultaneous operation of both for operating the second mentioned means.

3. In an automotive vehicle, the combination with an engine, a fuel control throttle for said engine, an engine operated governor for operating said throttle adjustable to vary operation thereof, of clutch and brake pedals, respectively, the former for establishing a driving relation between said engine and vehicle, and a clutch between said governor and throttle operative to connect and disconnect the governor and throttle, settable means to adjust said governor to vary its operation, means operatively connecting said settable means to said clutch whereby said settable means is operative to connect and disconnect the governor, and means operative by independent operation of said pedals and also by simultaneous operation of both and coacting with said first means to disconnect said clutch.

4. In an automotive vehicle, the combination with an engine, a fuel control throttle for said engine, an engine operated governor for variably operating said throttle at different engine speeds, and clutch and brake pedals, respectively, the former for establishing a driving relation between said engine and vehicle, of a clutch between said governor and throttle operative to connect and disconnect said governor and throttle, a pivotally mounted bell crank for operating the clutch, a second pivotally mounted bell crank for operating the first bell crank to disconnect said clutch, a third lever pivotally mounted, means operatively connecting the third lever to the second-mentioned bell crank, and means to operate said third lever under independent operation of said pedals and also under simultaneous operation of both said pedals.

ARLIE D. WARREN.